July 11, 1950     A. J. FAUSEK ET AL     2,514,995
LIGHTING DEVICE

Filed July 19, 1948                          2 Sheets-Sheet 1

INVENTORS
ARTHUR J. FAUSEK
IRWING F. FAUSEK
BY *Em. Harrington*
ATTORNEY

July 11, 1950     A. J. FAUSEK ET AL     2,514,995
LIGHTING DEVICE
Filed July 19, 1948                                                    2 Sheets-Sheet 2
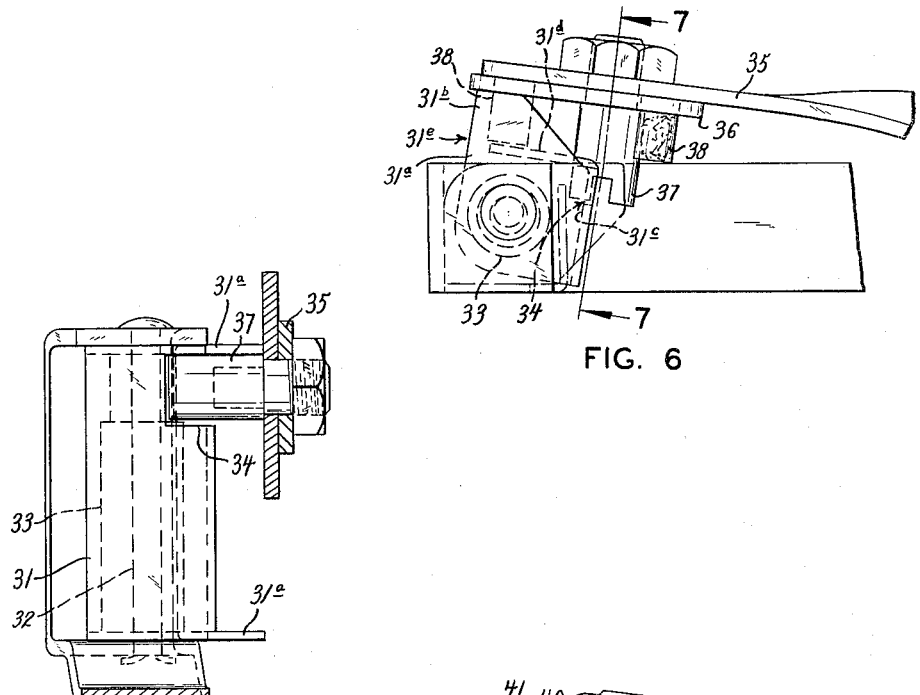
FIG. 6
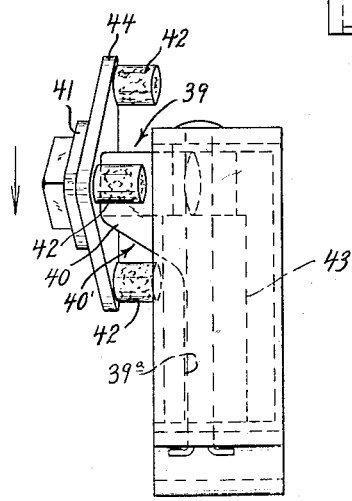
FIG. 7
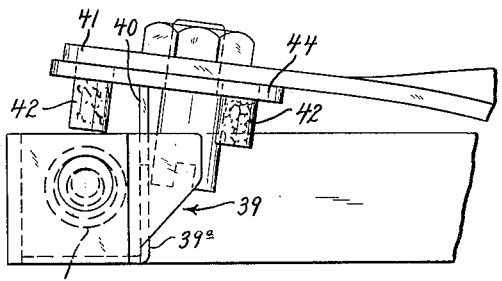
FIG. 8
FIG. 9
INVENTORS
ARTHUR J. FAUSEK
IRWING F. FAUSEK
BY *Em Harrington*
ATTORNEY Patented July 11, 1950

2,514,995

UNITED STATES PATENT OFFICE 2,514,995

LIGHTING DEVICE

Arthur J. Fausek and Irwing F. Fausek, Clayton, Mo.

Application July 19, 1948, Serial No. 39,384

7 Claims. (Cl. 67—6.1)

1

This invention relates generally to lighting devices of the sparking type heretofore employed for igniting gas and other combustibles, and more specifically to the type of lighting device disclosed by United States Letters Patent No. 1,853,205, granted to us on April 12, 1932, the predominant object of the invention being to provide a lighting device of this type which, because of its improved construction and arrangement will not be accidentally actuated to create sparks in the event it is dropped, or falls to the floor, or is otherwise subjected to impact.

The lighting device disclosed by the United States Letters Patent referred to above performs its intended function in a highly efficient manner, but one deficiency is present in connection with the use of such lighting device which, under certain circumstances, might reduce, somewhat, complete safety of use of the lighting device. The deficiency referred to is produced by the fact that the flint which is in the effective position with respect to the abrasive member of the lighting device is free at all times to move relative to said abrasive member in contact therewith, and, therefore, if the lighting device should be accidentally dropped and should strike the floor, or other article, in a manner to cause the effectively positioned flint to move along the abrasive member, sparks would be produced which might ignite gas present at the location at which the lighting device was dropped.

The main purpose of the present invention is to improve the construction and arrangement of the lighting device of the United States Letters Patent referred to above in such manner that the effectively positioned flint is prevented from moving along the abrasive member in the event the lighting device is dropped, or otherwise receives an impact, whereby the danger incident to production of unintended sparks is entirely eliminated.

Fig. 6 is an enlarged, fragmentary side elevation of still another form of the present invention.

Fig. 7 is a section taken on line 7—7 of Fig. 6.

Fig. 8 is an enlarged, fragmentary side elevation of yet another form of the present invention.

2

Fig. 9 is an end elevation of the form of the invention shown in Fig. 8.

Figure 1:
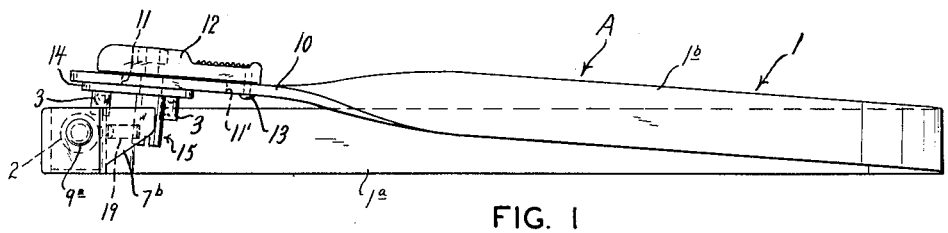
Fig. 1 is a side elevation of the improved lighting device of this invention.
Figure 2:
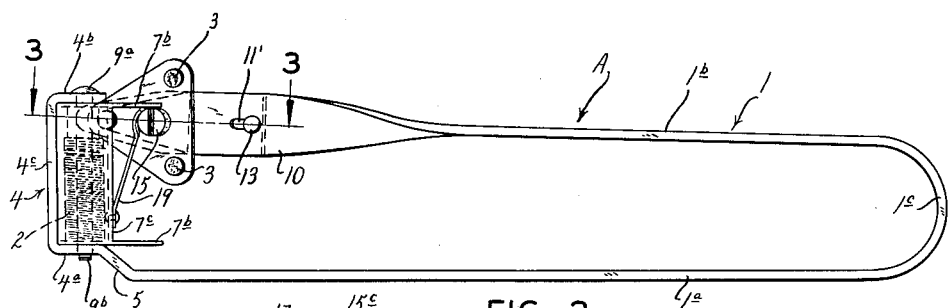
Fig. 2 is an inverted plan view of the lighting device illustrated by Fig. 1.
Figure 3:
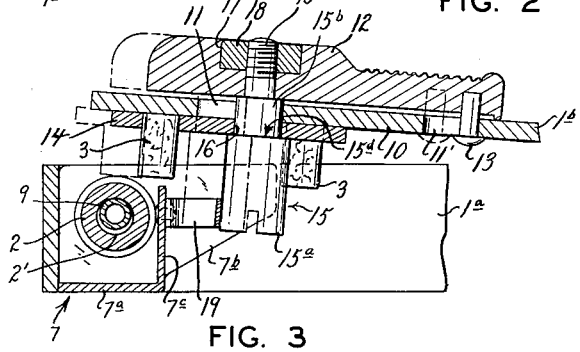
Fig. 3 is an enlarged section taken on line 3—3 of Fig. 2.

In the drawings, wherein are shown for purposes of illustration, merely, several embodiments of the invention, A designates in Figs. 1, 2, and 3 the illustrated lighting device generally. The lighting device A includes a handle 1, an abrasive member 2 which is supported by a portion of said handle 1, and a plurality of sparking elements, or flints 3 supported by another portion of the handle 1 in a manner to permit of one of said sparking elements being moved with respect to and in contact with said abrasive member so as to produce sparks. The handle 1 preferably is formed from a strip of metal, or other suitable material, which is possessed of considerable resiliency, said strip being bent to assume a substantially U-shaped form, as is shown in Fig. 2. For the purpose of convenience in describing the invention we designate one leg portion of the handle 1 by the reference character 1a, the other leg portion of the handle by the reference character 1b, and the bowed connecting portion at the outer end of the handle by the reference character 1c.

The end portion of the leg portion 1b of the handle 1 opposite the end thereof which joins the bowed connecting portion 1c thereof is shaped as is illustrated in Fig. 2; that is to say a yoke 4 is provided which is comprised of oppositely disposed side walls 4a and 4b and an end wall 4c which is formed integral with said side walls 4a and 4b. The yoke 4 is integrally joined to the leg portion 1a of the handle 1 by an inclined connecting portion 5 whereby the handle 1 and the yoke 4 provide a unitary structure.

Supported within the yoke 4 is a box-like structure 7 which houses the abrasive member 2 of the device A, said box-like structure having a bottom wall 7a, opposed side walls 7b, and a rear wall 7c. It is to be noted that the opposed side walls 7b of the box-like structure 7 project rearwardly of the rear wall of said box-like structure considerable distances and these rearwardly projected side wall portions perform a function to be hereinafter set forth. The opposed side walls 7b of the box-like structure 4 contact with the opposed portions 4a and 4b of the yoke 4, while the forward edge of the bottom wall 7a of said box-like structure contacts with the portion 4c of said yoke, as is shown in Fig. 3.

The abrasive member 2 which may be formed of any suitable material, such as suitable metal, or the material known commercially as "Lava," is provided with an opening 2' which extends longitudinally therethrough from end to end thereof, and the opposed side walls of the box-like structure 7 and the portions 4a and 4b of the yoke are provided with openings that are alined with said opening 2' of the abrasive member. Extended through the openings of the yoke portions 4a and 4b, and the openings of the opposed walls of the box-like structure, and through the opening 2' of the abrasive member 2 is a tubular element 9 which is provided with a head 9a at one end that contacts with the outer face of the yoke portion 4b, said tubular element at its opposite end being provided with extensions 9b which are bent outwardly so as to retain the tubular element in its effective place in the lighter structure where it retains the box-like structure and the abrasive member in place within the yoke 4.

The forward end portion 10 of the leg portion 1b of the handle 1 is twisted approximately 90° with respect to the remainder of said leg portion, as is shown to good advantage in Figs. 1 and 2, the forward portion of said portion 10 preferably being tapered, and said portion 10 has formed therethrough slots 11 and 11' (Fig. 3) which extend longitudinally thereof. The portion 10 of the leg portion 1b has slidably mounted thereon an operating member 12, said operating member contacting with a face of said portion 10 and there being a headed rivet 13 whose head contacts with the opposite face of said portion 10 and whose shank extends through the slot 11' and is received in a recess formed in said operating member 12.

Associated with the portion 10 of the leg portion 1b is a head 14 of triangular shape, said head being supported by a bolt 15 so that it may be subjected to rotation when desired. The bolt 15 includes an enlarged head portion 15a, an intermediate portion 15b of less diameter than said head portion, and a screwthreaded shank portion 15c which is of less diameter than said intermediate portion (Fig. 3). The head 14 is provided with an opening 16 through which the intermediate portion 15b of the bolt extends, and a portion of said head surrounding said opening 16 is interposed between a shoulder 15d formed on the bolt 15 and a face portion of the portion 10 of the leg portion 1b. The operating member 12 is provided with a cavity 17 that receives a nut 18, and the screwthreaded shank portion 15c of the bolt 15 is screwed into the bore of said nut. Also, the intermediate portion 15b of the bolt 15 extends through the slot 11 of the portion 10 of the leg portion 1b. The sparking elements or flints 3 are fixedly mounted on the head 14 and project therefrom, there being three of these flints shown in the embodiment of the invention illustrated in Figs. 1, 2, and 3. Additionally, a leaf spring 19 is provided for urging the operating member 12 and the parts associated therewith, rearwardly, said leaf spring being secured at one of its ends to the wall 7c of the box-like structure 7 and having an arcuate portion at its opposite end and which engages the head portion 15a of the bolt 15.

When the improved lighting device is not being actuated to produce sparks the effective sparking element 3 is maintained by the leaf spring 19 in the position in which it is shown in full lines to good advantage in Fig. 3; that is to say said effective sparking element is disposed rearwardly of the abrasive member 2 and out of contact therewith, and, also, free movement of the forward end of the leg portion 1b is restrained by the leaf spring 19. Because of this situation, dropping the lighting device to the floor, or otherwise subjecting it to impact, will not cause sparks to be produced by movement of the effective sparking element in contact with the abrasive member. When, however, it is desired to produce sparks through the use of the lighting device, the leg portions 1a and 1b are grasped by the operator and with the thumb of the hand which grasps said leg portions the operator moves the operating member 12 forwardly against the force of the leaf spring 19 to bring the effective sparking element in contact with the abrasive member. The operator then moves the leg portions 1a and 1b quickly toward each other, whereby movement of the sparking element relative to the abrasive member in contact therewith will produce sparks. When the sparks are being produced, as described above, the operating member 12 is held by the operator's thumb in its forward position, and after said sparks have been produced said operating member is released, whereupon the leaf spring 19 moves said operating member rearwardly to dispose the effective sparking element out of contact with respect to the abrasive member 2.

When a sparking element 3 has been used repeatedly in producing sparks it will become worn and when this happens the bolt 15 may be unscrewed slightly to permit the head 14 to be rotated to bring an unworn sparking element into the effective position, whereupon the bolt is tightened to hold said head in the position to which it has been adjusted. Obviously, when all of the sparking elements associated with a head 14 have become worn through use a new head with unworn sparking elements must be caused to replace the head with the worn sparking elements.

The rearwardly projected portions of the opposed side walls 7b of the box-like structure serve as abutments which limit movement of the leg portion 1b relative to the leg portion 1a of the handle 1. In other words, the head portion 15a of the bolt 15 is disposed between said rearwardly projected portions of said opposed side walls 7b and said head portion of said bolt contacts with said projected portions of said opposed side walls at the opposite limits of movement of the forward portion of the leg portion 1b relative to the leg portion 1a.

Figure 5:
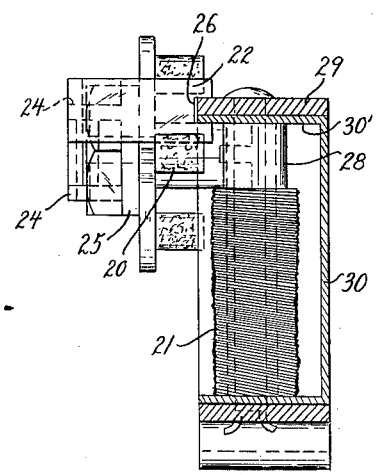
Fig. 5 is a section taken on line 5—5 of Fig. 4.
Figure 4:
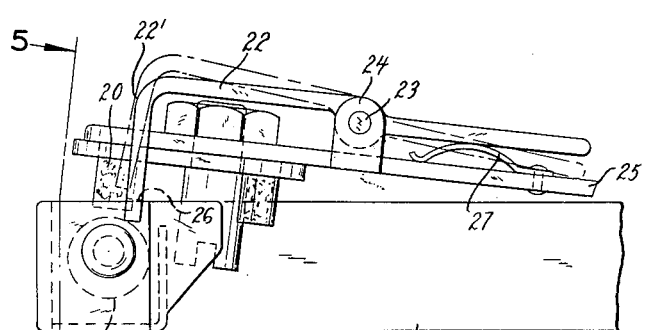
Fig. 4 is an enlarged, fragmentary side elevation of a modified form of the present invention.

The modified form of the invention shown in Figs. 4 and 5 is constructed in accordance with the structure of the device illustrated by Figs. 1, 2 and 3, with the exception that the structure of Figs. 4 and 5 is provided with a different type of locking means for locking the effectively positioned sparking element 20 against accidental movement in contact with the abrasive member 21. The locking means of Figs. 4 and 5 comprises a latch element 22 which is pivotally supported by a pivot element 23 between a pair of ears 24 which project from the leg portion 25 of the handle of the device. The latch element 22 is provided with an angularly extended portion 22' at its forward end and this portion 22' has a notch 26 formed therein at the edge thereof. Also, the rear portion of the latch element 22 is spaced from an adjacent part of the leg portion 25, and a bowed leaf spring 27, which is secured at one end thereof to said leg portion 25, is engaged by said rear portion of the latch element. The abrasive member 21 of Figs. 4 and 5 is provided at one end with a neck portion 28 which is smooth and is of less diameter than the remainder of the abrasive member.

When the lighting device of Figs. 4 and 5 is not in use the leaf spring 27 maintains the angular portion 22' thereof in a position where an upper edge portion of the yoke portion 29 and an upper edge portion a wall 30' of the box-like structure 30 project into the notch 26 of said angular portion 22', as is shown in Fig. 5. This effectively locks the forward portion of the leg portion 25 against movement relative to the leg portion 25a, and when the leg portion 25 is locked against movement as described, the effective sparking element 20 is disposed adjacent to the smooth, reduced neck of the abrasive member 28. When, however, it is desired to actuate the device to produce sparks, the operator grasps the leg portions 25 and 25a and with his thumb depresses the rear portion of the latch element 22 against the force of the leaf spring 27. This moves the angular portion 22' of the latch element out of engagement with respect to the yoke portion 29 and the wall 30' of the box-like structure 30, and permits the leg portion 25 to be moved in a manner to cause the effective sparking element to be moved along the face of the abrasive member in contact therewith so as to produce sparks.

According to the form of the invention shown in Figs. 6 and 7 the box-like structure 31 is rotatable about the element 32 which extends through the opening formed through the abrasive member 33. The box-like structure 31 comprises opposed walls 31a which are provided with projected portions 31b, and a wall 31c from which an angularly extended wall 31d projects, the box-like structure being open at the side thereof indicated by the reference character 31e. Also, the wall 31c of the box-like structure 31 has a notch 34 formed therein which performs an important function to be hereinafter set forth. The leg portion 35 of the handle of the device has a head 36 fixed thereto by a bolt 37, said head fixedly supporting a plurality of sparking elements 38.

When the device of Figs. 6 and 7 is not in use the box-like structure 31 is disposed in the position in which it is shown by full lines in Fig. 6 and when said box-like structure is so positioned the head portion of the bolt 37 projects into the notch 34 formed in the wall 31c thereof, whereby the leg portion 35 is locked against movement which would move the effectively positioned sparking element 38 longitudinally of the abrasive member 33. Also, when the box-like structure 31 is positioned as is shown by full lines in Fig. 6, the projected portions 31b of the opposed side walls of said box-like structure contact with the forward portion of the leg portion 35 and cam said forward portion of said leg portion, and the effectively positioned sparking element 38 associated therewith, away from the abrasive member 33. When the device of Figs. 6 and 7 is to be actuated to produce sparks, the box-like structure 31 is rotated to the position in which it is shown by dotted lines in Fig. 6 to free the head portion of the bolt 37 from the notch 34 and to permit the effectively positioned sparking element to move to a position where it may be caused, by movement of the leg portion 35, to move relative to and in contact with the abrasive member 33 to produce sparks.

The form of the invention shown in Figs. 8 and 9 comprises a box-like structure 39 which is provided with a wall 39a that has formed thereon a projection 40 which provides a cam having an inclined edge 40'. The projection 40 serves, when the device is not in use, to maintain the forward end portion of the leg portion 41 in a position where the effectively positioned sparking element 42 is retained in a position where it is spaced a substantial distance from the abrasive member 43, as is shown in Fig. 8. When, however, the device is to be actuated to produce sparks the handle of the device is grasped and the leg portion 41 is moved in the direction indicated by the arrow in Fig. 9, whereupon the head 44 which supports the sparking elements 42 will slide downwardly along the inclined edge 40' of the projection so as to permit the effectively positioned sparking element to contact with the abrasive member and produce sparks.

We claim:

1. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an element which is movably supported by said leg portion that supports said sparking element and which serves on actuation thereof to one position to maintain said sparking element out of spark-producing contact with respect to said abrasive member.

2. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an operating element which is movably supported by said leg portion which supports said sparking element and which is adapted to move said sparking element into and out of its effective sparking position with respect to said abrasive member.

3. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an operating element which is slidably supported by said leg portion which supports said sparking element, a head on which said sparking element is mounted, and means for connecting said head to said operating element whereby appropriate movement of said operating element will move said sparking element into and out of its effective sparking position with respect to said abrasive member.

4. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an operating element which is slidably supported by said leg portion which supports said sparking element, a head on which said sparking element is mounted, means for connecting said head to said operating element whereby appropriate movement of said operating element will move said sparking element into and out of its effective sparking position with respect to said abrasive member, and means which tends to move said operating element to a position where said sparking element is out of its effective sparking position with respect to said abrasive member.

5. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an operating element which is slidably supported by said leg portion which supports said sparking element, a head on which said sparking element is mounted, means comprising a bolt for connecting said head to said operating element whereby appropriate movement of said operating element will move said sparking element into and out of its effective sparking position with respect to said abrasive member, and leaf spring means which engages a portion of said bolt and which tends to move said operating element to a position where said sparking element is out of its effective sparking position with respect to said abrasive member.

6. A lighting device comprising a resilient supporting element having leg portions capable of relative movement, an abrasive member supported by one leg portion of said resilient supporting member, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising an element which is movably supported by a leg portion of said supporting element and which serves on movement thereof to maintain said sparking element out of spark-producing contact with respect to said abrasive member.

7. A lighting device comprising a resilient supporting element having leg portions capable of relative movement, an abrasive member supported by one leg portion of said resilient supporting element, a sparking element supported by another leg portion of said supporting element, said supporting element being yieldable to permit movement of said sparking element relative to said abrasive member in contact therewith, and means for preventing unintended movement of said sparking element relative to said abrasive member in contact therewith, said means comprising a cam for moving said sparking element away from said abrasive member and out of spark-producing contact with respect thereto.

ARTHUR J. FAUSEK.
IRWING F. FAUSEK.

REFERENCES CITED

The following references are of record in the file of this patent:

UNITED STATES PATENTS

| Number | Name | Date |
|---|---|---|
| 327,065 | Burton | Sept. 29, 1885 |
| 1,764,896 | Segal | June 17, 1930 |
| 1,849,528 | Johnson | Mar. 15, 1932 |
| 1,853,205 | Fausek et al. | Apr. 12, 1932 |

FOREIGN PATENTS

| Number | Country | Date |
|---|---|---|
| 163,336 | Switzerland | Aug. 15, 1933 |
| 515,381 | France | Nov. 25, 1920 |
| 622,884 | Germany | Dec. 7, 1935 |